United States Patent [19]

Labbé et al.

[11] E Patent Number: Re. 33,055

[45] Reissued Date of Patent: Sep. 12, 1989

[54] DOPPLER TRACKING PROCESSOR AND TIME OF CLOSEST APPROACH DETECTOR

[75] Inventors: Paul Labbé, Kanata; André Morin, Charlesbourg, both of Canada

[73] Assignee: Department of National Defense, Ottawa, Canada

[21] Appl. No.: 221,748

[22] Filed: Jul. 20, 1988

Related U.S. Patent Documents

Reissue of:

[64] Patent No.: 4,672,381
Issued: Jun. 9, 1987
Appl. No.: 645,762
Filed: Aug. 30, 1984

[30] Foreign Application Priority Data

Jan. 5, 1984 [CA] Canada ..... 444716

[51] Int. Cl.[4] ..... G01S 13/08

[52] U.S. Cl. ..... 342/99; 342/68

[58] Field of Search ..... 102/211, 214, 215; 73/861.25; 342/58, 68, 99, 118–146

[56] References Cited

U.S. PATENT DOCUMENTS

| | | | |
|---|---|---|---|
| 3,774,213 | 11/1973 | Riggs | 343/12 MD X |
| 3,911,438 | 10/1975 | Banks | 343/12 MD X |
| 3,938,147 | 2/1976 | Kalmus | 343/7 PF |
| 4,031,534 | 6/1977 | Kallmann et al. | 343/12 MD |
| 4,140,060 | 2/1979 | Brenner | 343/7 PF |
| 4,290,066 | 9/1981 | Butler | 343/7 A |
| 4,360,812 | 11/1982 | Peperone | 343/7 PF |
| 4,413,531 | 11/1983 | Karplus et al. | 73/861.25 |

FOREIGN PATENT DOCUMENTS

| | | | |
|---|---|---|---|
| 59-32879 | 2/1984 | Japan | 343/7 PF |

OTHER PUBLICATIONS

"IEEE Standard Dictionary of Electrical and Electronics Terms", p. 197; New York, Wiley-Interscience, 1984.

*Primary Examiner*—Thomas H. Tarcza
*Assistant Examiner*—Bernarr Earl Gregory
*Attorney, Agent, or Firm*—Cushman, Darby & Cushman

[57] ABSTRACT

Disclosed is a Doppler tracking processor and time of closest approach detector for use in active or semiactive radar-guided missiles. A known processor uses a fractional Doppler gate (FDG) to process the Doppler signal to activate the warhead detonation properly at time of closest approach (TCA); it indicates when the Doppler energy has rolled off to, for example, one-half the pre-intercept Doppler frequency. The present invention uses a Doppler tracking processor and TCA detector. The tracking filter can extract the instantaneous value of the Doppler frequency even during roll-off. The system processes the Doppler from the preintercept frequency up to an appropriate fractional frequency occurring at TCA, at which time it provides a signal for use in warhead detonation.

7 Claims, 8 Drawing Sheets

| FIG. 6A |
|---|
| FIG. 6B |

DOPPLER TRACKING PROCESSOR AND TIME OF CLOSEST APPROACH DETECTOR

Matter enclosed in heavy brackets [ ] appears in the original patent but forms no part of this reissue specification; matter printed in italics indicates the additions made by reissue.

BACKGROUND OF THE INVENTION

This invention relates to a Doppler tracking processor and time of closest approach detector for use in a semi-active or active continuous wave (CW) radar system. An example of that is the application of the invention to CW semi-active guided missiles. So, before presenting the invention, its context will be introduced in the following text.

With guided missiles used against moving targets, such as aircraft, it is necessary to detonate the missle at the time of closest approach (TCA) to the target because of the unlikelihood of the missile scoring a direct hit on the target. The problem consists in detecting accurately the time of closest approach (TCA) to the target by processing the Doppler signal in the seeker of a CW radar semi-active missile when the TCA detector has been armed by other missile subsystems, such as a safety-arming (S&A) device which maintains the missile warhead in an unarmed condition until the missile has been intentionally launched and has traveled a safe distance from the launching aircraft.

Guidance and control of missiles are based on different techniques of major importance (beam rider guidance, command guidance, preset guidance and homing guidance). One of them, the homing guidance, generates steering signals from information received at the missile seeker from the target.

Homing guidance systems are of three types: active, semi-active and passive systems. An active homing system beams a signal at the target and generates steering commands from the reflected signal. This homing device on the missile reveals the presence of the missile to the target. In a semi-active homing system, a remote transmitter, located outside the missile (on an airplane, a ship or any other equipment with an appropriate antenna to illuminate the scenario), bounces signals off the target to the missile. The remote illuminating transmitter reveals its position and reveals the existence of a missile to the target. A passive homing system receives radiated energy emanating from the target. The passive homing device does not reveal the position or the existence of the missile to the target by emitting any energy (as a target, a missile radiates energy . . . ). In these three system radiated energy may be radio, optical (IR, UV and visible light) and sound signals.

The realization of the present invention is concerned with a CW radar "semi-active" missile. Even if the missile has only a receiver, it is called "semi-active" since it requires an external illumination to guide on the target. The energy transmitted from the illuminator transmitter external to the missile is received by rear and front antennas on the missile. The rear signal is the sample of the radiated energy from the transmitter used as a reference. The front signal is the energy from the illuminator that has been reflected by the target. These microwave signals are mixed and low-pass filtered to deliver a signal at lower frequency. This signal is termed the video Doppler since it is not necessarily a narrow-band signal and because it includes relative missile-target information with noise and interference.

The target signal is the radio energy returned to a radar by a target, also known as echo signal or video signal. Video is pertaining to the demodulated radar received output that is applied to a radar indicator. In low-altitude environments, sea clutter is often dominant. With targets composed of several reflectors, forward scatter from reflectors already passed, and backscatter from reflectors yet to be passed are sometimes important contributors to the Doppler.

It is known to use a fractional Doppler gate (FDG) to process the Doppler signal to activate the warhead detonation properly at TCA. In that prior arrangement the TCA Doppler detection is accomplished by a tunable band-pass filter (constant bandwidth), adjusted at a fractional Doppler frequency, preceded by a fast automatic gain control unit to normalize the entire signal at it input, and followed by an envelope detector and a high-pass filter (differentiator) in such a way as to detect only amplitude increases greater than a fixed threshold of the signal at the output of the band-pass filter. This TCA Doppler detector indicates when the doppler energy has rolled off to a fractional frequency within the constant bandwidth of the band-pass. The time-frequency plane is related to the TCA in the time-distance plane, by the physical and the geometrical characterization of the intercept (this will be explained later). The FDG center frequency is tuned at about one-half the preintercept Doppler frequency, $0.5f_{do}$.

Assuming that all the other arming subsystems operate properly, the present invention subsystem achieves a better signal processing than by the FDG since:

1. It is not sensitive to amplitude variation, as it reacts as a frequency discriminator.
2. It has to detect the Doppler frequency decrease from its pre-intercept value ($f_{do}$) down to a fraction of $f_{do}$ which corresponds to the TCA. This avoids premature TCA detection.

SUMMARY OF THE INVENTION

The present invention involves tracking the Doppler signal before the intercept and during the Doppler roll-off in such a way as to detect timely any frequency of the roll-off up to one half of the pre-intercept frequency in the time-frequency plane. Thus, using the relation between the time-frequency plane and the time-distance plane, this processor can deliver an appropriate and accurate TCA detection when all the other subsystems have enabled it to output.

In accordance with a broad aspect of the invention there is provided a Doppler tracking processor and time of closest approach detector system comprising first means for deriving a reference signal proportional to a predetermined fraction of the frequency of a Doppler signal second means for deriving a second signal proportional to said frequency of the Doppler signal, and comparator means for comparing said second signal and said reference signal, said comparator producing an output signal if said second signal drops below said reference signal.

BRIEF DESCRIPTION OF THE DRAWINGS

The prior art and the present invention will now be further described in conjunction with the accompanying drawings, in which.

DETAILED DESCRIPTION OF THE PRESENTLY PREFERRED EXEMPLARY EMBODIMENT

The time of closest approach (TCA) is defined as the time where the missile-target distance (range) is at its minimum value (whichever value it is). This minimum value, the miss distance ($d_m$), occurs at TCA as illustrated by the range curve of FIG. 2. Also TCA is the time corresponding to the closest point of an approach (CPA).

TCA: the time reference that corresponds to the CPA

CPA: the spacial point of the missile trajectory of an engagement where the missile-target distance is at the minimum value.

$d_m$: the minimum value of the missile-target distance.

The basic fuze presently known is the fractional Doppler gate (FDG) whose operation depends on the Doppler behaviour of an intercept. The FDG is an electronic circuit which receives energy from the target at the closest-point-of-approach (CPA), converts this energy to a high energy pulse, and supplies the pulse to the warhead detonator.

Figure 2:
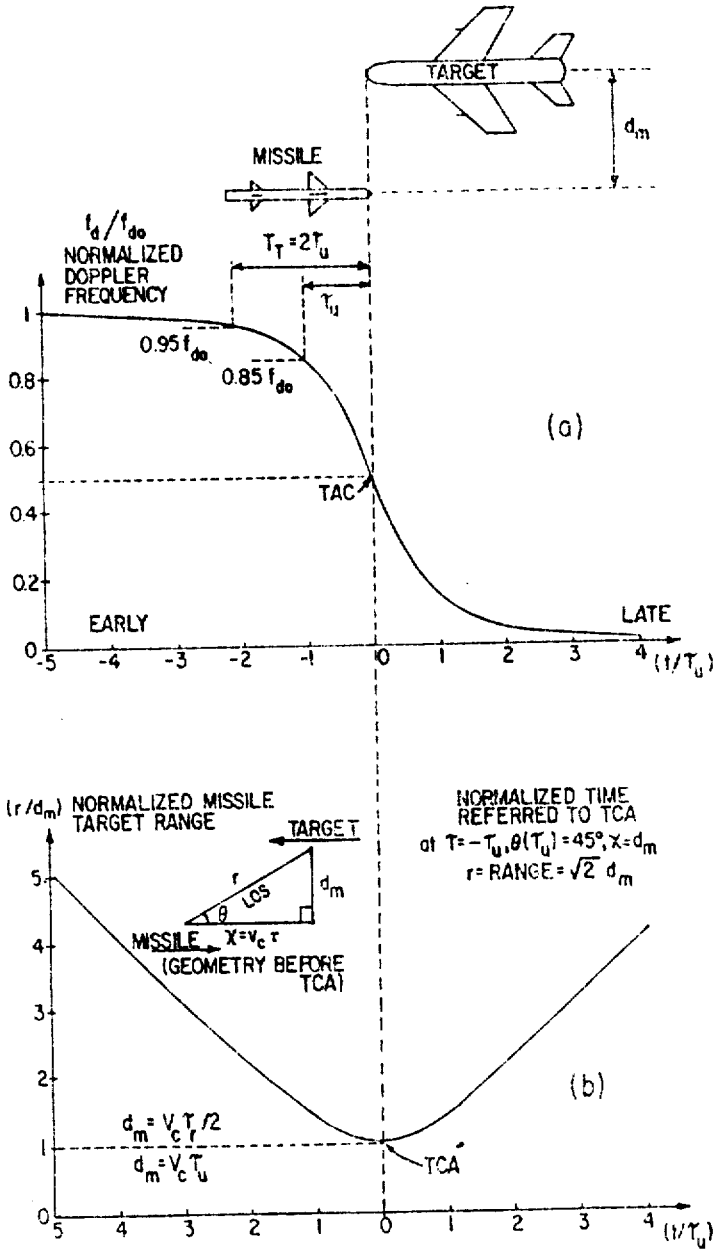
FIG. 2 is a diagram which illustrates the relation between the time-frequency plane, part (a), and the time-distance plane, part (b), of an intercept when the radial to transverse speed ratio is high.

When the closing on relative velocity $V_c$ is almost radial, the Doppler frequency ($f_d$) can be expressed in a simple equation:

$$fd \simeq \frac{Vf_o}{c}(1+\cos\theta)\frac{f_o}{c} = \frac{1}{\lambda_o}$$

$$\simeq (1+\cos\theta)\frac{V_r}{\lambda_o} \text{ where } \lambda_o = TX \text{ (transmit) wavelength}$$

where $V_r$=Vector representing relative radial velocity between the target and missile (since $V_c \simeq V_r$, as for FIG. 2)

$f_o$=illuminator transmitter frequency of the CW carrier c=Velocity of propagation $\theta$=Angle between the relative velocity vector and the line-of-sight from the missile to target.

When the missile is at a position along the trajectory where the range from missile to target is greater than ten times the miss distance, the angle $\theta$ can be treated as zero and $$fd = \frac{2Vf_o}{c} = \frac{2V_r}{\lambda_o}$$

This value is $f_d$, the pre-intercept Doppler Frequency.

When the missile is a beam of the target (CPA) the angle $\theta$ is 90 degrees and $$fd = \frac{Vf_o}{c}$$

It follows that the Doppler frequency at CPA is approximately one-half the Doppler frequency of the guidance portion of the flight just before the intercept region (when the range from the missile to the target is ten times the miss distance).

The FDG can be regarded as a narrow-band filter tuned to receive energy at the half-Doppler frequency. This function is accomplished by mixing the Doppler signal with a local oscillator reference signal and amplifying the resulting difference frequency in a tuned amplifier.

Figure 3:
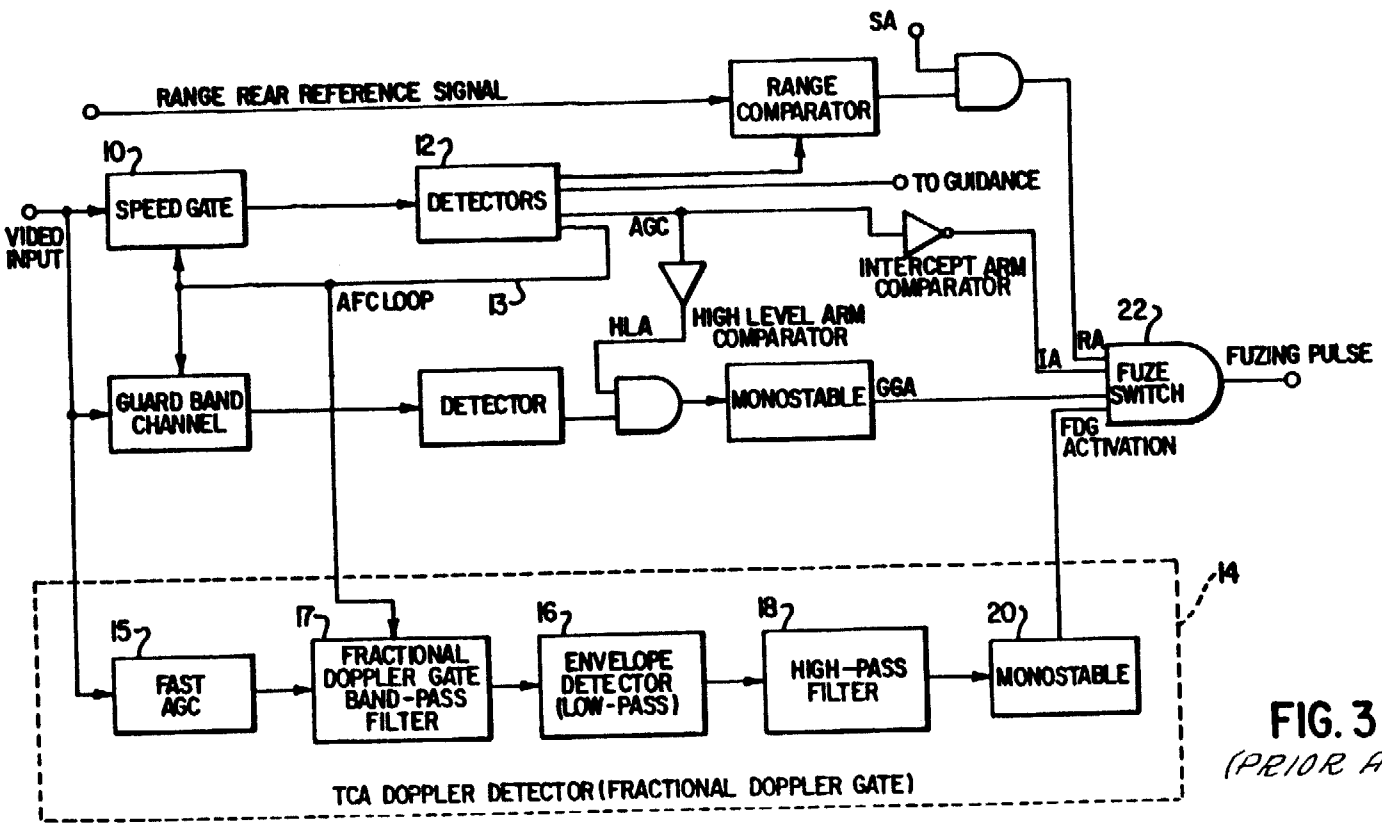
FIG. 3 (PRIOR ART)
FIG. 3 is a block diagram of a prior art TCA Doppler detector using a fractional Doppler gate.

FIG. 3 is a block diagram of a complete Doppler processing system of the prior art type, and will now be briefly described.

The video input (video Doppler) is applied to a speedgate 10. As the missile is launched and accelerates, the missile longitudinal accelerometer (not shown) programs the missile speedgate 10 to correspond with the actual missile-target velocity of closure. The output of speedgate 10 is detected at 12 and, via a AFC loop 13, controls the frequency of a local oscillator in the speedgate 10 so that the Doppler signal is centered in the speedgate pass-band intermediate frequency (IF). The frequency of a local oscillator in the fractional doppler gate (FDG) 14 is controlled by a voltage derived from the AFC of the speedgate. When the Doppler in the speedgate begins the rapid shift which occurs at intercept, the rate of change of the Doppler frequency exceeds the tracking capability of the speedgate. This actuates a control circuit (within what is labelled "Detector" at FIG. 3) that keeps (holds) the voltage that tunes the FDG local oscillator to the desired frequency during an intercept. Thus, the difference between the FDG pass-band intermediate frequency and the FDG local oscillator frequency is adjusted to be approximately one half the Doppler frequency present in the speedgate during the guidance phase of the flight. And this difference is maintained so that the equivalent pass-band center frequency is at approximately one half the previous value of the Doppler ($f_{do}$) when the speedgate loses the signal due to the rapid change of frequency of the Doppler signal during the intercept phase of the flight.

The TCA Doppler detection is then accomplished by a tunable band-pass filter 17 (constant bandwidth with two states, selectable as function of Doppler frequency range) in FDG 14, adjusted at a fractional Doppler frequency, preceded by a fast automatic gain control unit 15 to normalize the entire signal at its input, and followed by an envelope detector 16 and a high-pass filter (differentiator) 18 in such a way as to detect only amplitude increases greater than a fixed threshold of the signal at the output of the band-pass filter 17 in FDG 14. This TCA Doppler detector indicates when the Doppler energy has rolled off to a fractional frequency within the contant bandwidth (for a specific range of $f_{do}$) of the band-pass. The center frequency of FDG 14 is tuned at about one-half the pre-intercept Doppler frequency, $0.5f_{do}$.

The output of high-pass filter 18 triggers what is equivalent to a monostable 20 which provides one input to fuze switch 22. Fuze switch 22 (an AND gate) provides a fuzing pulse to detonate the warhead (not shown) provided the other fuze inputs are present. These other inputs are Range Arming (RA), Intercept Arm (IA) and Guard Gate Activation (GGA) as shown by the sequence of events of FIG. 1(b). It is not proposed to discuss the components of FIG. 3 relating to these other fuzing inputs as they are not particularly germane to the present discussion.

Figure 4:
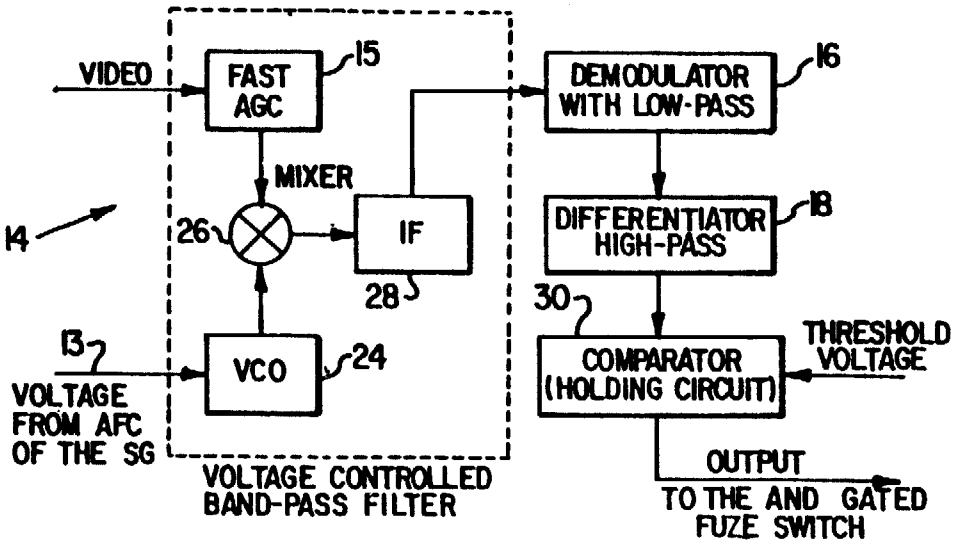
FIG. 4 (PRIOR ART)
FIG. 4 is a more detailed block diagram of a fractional Doppler gate.

The fractional Doppler gate (FDG) 14 is shown in more detail in FIG. 4 and is seen to comprise a fast AGC 15 to which the video is applied as an input. A voltage controlled oscillator (VCO) 24 receives the voltage from AFC loop 13 (see FIG. 3) of the speed gate 10. The outputs of fast AGC 15 and VCO 24 are fed to a mixer 26, the output of which feeds an IF filter 28. The IF filter 28 feeds a demodulator (low-pass envelope detector) 16 which is followed by high-pass filter (differentiator) 18, and comparator and holding circuit 30 (or the comparator 20 in FIG. 3), the output of which is fed to the AND gate fuze switch (22 in FIG. 3).

The fractional Doppler gate (FDG) 14 is a selective gate tuned at approximately 0.5 $f_{do}$. The FDG center frequency is controlled by the output of the automatic frequency control (AFC) loop 13 of the speedgate 10. The ratio between the center frequencies of the FDG and the speedgate is approximately set to one-half.

The mixer 26 with the VCO 24 and the IF filter 28 are equivalent to a voltage controlled band-pass filter. The center frequency of this band-pass filter is voltage adjusted to be at 0.5 $f_{do}$. The fast AGC at the input of the IF filter 28 normalizes the energy of the video signal. The high-pass filter (differentiator) 18 at the output of the demodulator removes the mean value of the noise at 0.5 $f_{do}$ prior to intercept. The threshold of the comparator 30 protects the FDG against false intercept detections.

At intercept, the ratio of the missile-target distance to the illuminator-missile distance is very small. Then the missile-target closing velocity can be factored in radial (parallel to the CW propagation from the illuminator to the missile and the target) and transverse components. This forms an orthogonal basis from which any intercept can be modelled. For any given radial to transverse velocity ratio, the invention could deliver a pulse at the exact TCA of an intercept using the relation between the time-frequency plane and the time-distance plane.

This model can be divided in two simple cases that are intrinsic to it. For a radial velocity much smaller than the transverse velocity, the TCA occurs when the instantaneous Doppler frequency is equal to zero. This is similar to the Doppler roll-off of an active system even if the missile is semi-active. For a transverse velocity much smaller than the radial velocity, the TCA occurs when the instantaneous Doppler frequency is at one-half its pre-intercept value. This case is illustrated at FIG. 2.

For this particular case, a TCA detector outputs a pulse exactly at TCA when it is adjusted at one-half Doppler. In the TCA detector according to the present invention, FIG. 5, a comparator 52 verifies continually the relation between two voltages. One of them is the low-pass filtered ($\tau \simeq 0.3$ s) output of the AFC of the missile speedgate. It is attenuated by a factor of two by a fractional ratio converter 50 to represent one-half of the preroll-off reference. The other is the low-pass filtered ($\tau \simeq 3$ ms) voltage of the frequency loop of the tracking filter, i.e. the.output of filter 51. This voltage represents the instantaneous Doppler frequency. Then, before TCA the comparator 52 outputs is at zero and at TCA the comparator turns on rapidly ($\tau \simeq 1$ $\mu$s). This activates the monostable 20 to produce a pulse of predetermined duration which is applied to fuze switch 22.

In most all engagements the missile-target velocity is essentially radial. For a radial component larger than 60% of the magnitude of the closing velocity, the one-half Doppler occurs within 10% of $\tau_u$ before TCA. At FIG. 2 the parameter $\tau_u$, the intercept time constant, is defined as the unit of time equal to the ratio of the miss distance to the closing velocity.

A TCA detector can be used in a boost-glide missile. During glide, the missile slows down and so does the Doppler frequency tracked by the speedgate. The rate of change of the Doppler frequency is of the order of a few Hz/ms. The FDG center frequency follows this change at one-half rate. At intercept the rate of change of the Doppler frequency is much higher, on the order of a few kHz/ms. This rate of change is too large for the AFC of the speedgate. The energy drops off its band-pass. The intercept arm (IA, FIG. 3) is then activated. The voltage at the AFC of the speedgate, when the IA is activated, is proportional to the frequency of the Doppler just before the roll-off. This is due to the fact that the time constant of the AFC is quite large ($\tau \simeq 100$ ms) and that the IA time constant is small ($\tau \simeq 1$ ms). The activation of the IA forces the FDG to hold its previous value which is therefore the 0.5 $f_{do}$ (one-half the preintercept Doppler frequency).

During the roll-off, the Doppler shifts toward the FDG center frequency. If the signal to noise ratio at the output of the band-pass filter 17 of the FDG is larger than 0 dB, this incoming signal generates an increase of the output level. The FDG is activated when the rate of this increasing voltage is large enough to build, at the differentiator 18 output, a voltage larger than 1.2 V (the threshold of comparator 30, FIG. 4). The FDG activation holds on for a short period of time (2 ms). If during its activation the other gates (IA, RA, GGA, FIG. 3) are on, the fuze switch 22 turns on and a fuze pulse activates the squib of the war head.

Figure 5:
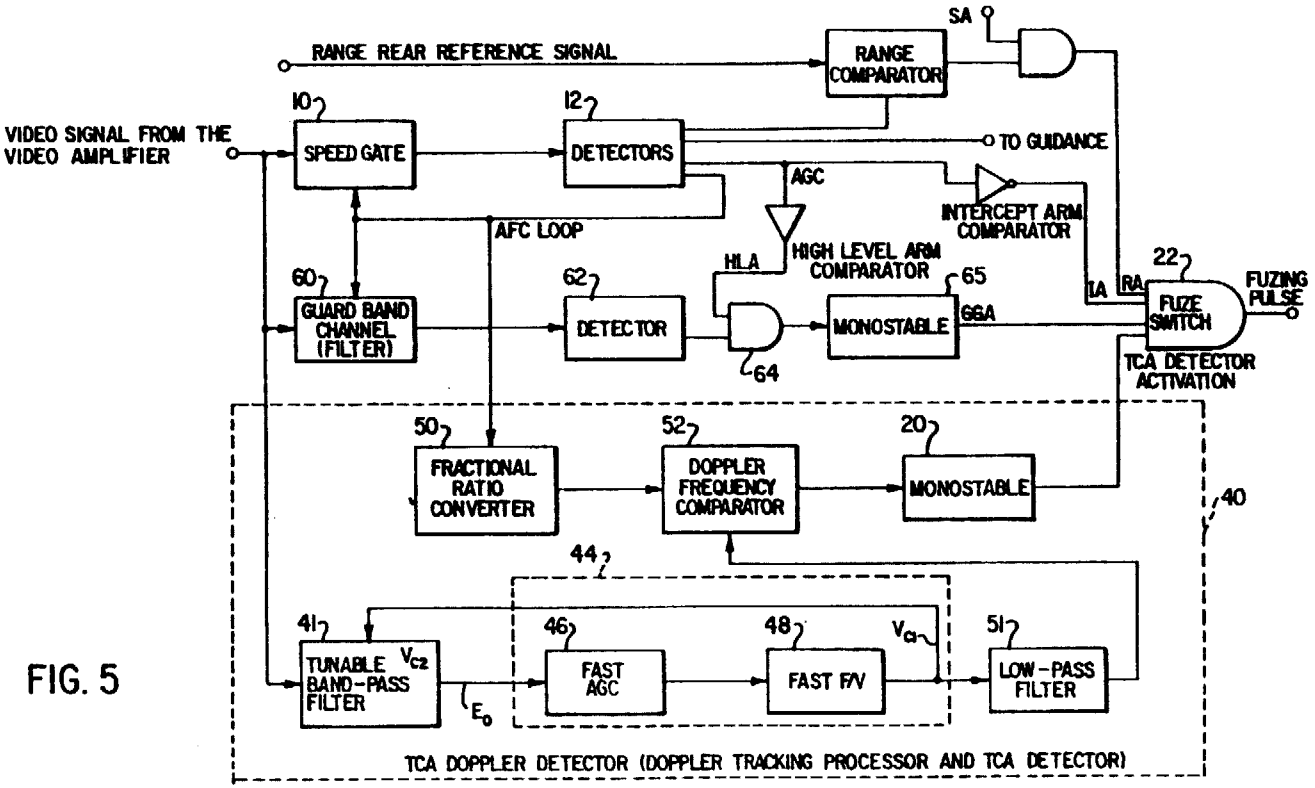
FIG. 5 is a block diagram of a Doppler tracking processor and TCA detector according to the present invention, FIGS. 6A and 6B, which fit together as shown in FIG. 6C, comprise a schematic diagram of the Doppler processor and TCA detector according to the invention.

FIG. 5 is a block diagram of an arrangement according to the invention. Several components are identical to those shown in FIG. 3, but the FDG 14 has been replaced by a Doppler tracking processor and TCA detector 40. The tracking filter 41 of this new TCA detector has the ability to extract the instantaneous value of the Doppler frequency of a roll-off. The tunable band-pass filter 41 stays tuned to the instantaneous Doppler frequency even during roll-off. Thus, from this instantaneous value, it is possible to estimate the value of the miss distance at TCA or at any time of a roll-off. This comes from the fact that any intercept can be described by a model with normalized parameters as illustrated in FIG. 2. This figure does not illustrate the general model but illustrates a simplified model and has been briefly discussed above.

FIG. 5 illustrates the entire system including the new TCA Doppler detector according to the invention. In this arrangement, a Doppler processor and TCA detector 40, processes the Doppler signal by a narrow band-pass filter 41( constant Q or proportional bandwidth)

tuned automatically to be frequency-locked on the main Doppler signal by means of a fast frequency-locked loop 44. The loop 44 includes a Fast Automatic Gain Control (FAGC) unit 46 to match the band-pass filter 41 output signal to the input of a fast frequency to voltage converter (F/V) 48 that allows the tracking filter 41 to follow the rapid change in frequency of a Doppler rolling-off signal. This sub-system uses standard low costs ICs like Operational Amplifier, Operational Transconductance Amplifier (OTA), Exclusive OR (EXOR) and Monostable, as illustrated by the schematic of FIG. 6.

The novel aspect of this invention concerns the dynamic tracking of the Doppler roll-off as opposed to the former or present static detection of a band-pass filter waiting to capture a transient signal at a fixed specific fractional frequency.

This system processes continuously the entire rolling-off energy of the Doppler from the pre-intercept frequency (preintercept time and space) up to the appropriate fractional frequency in such a manner as to be more insensitive to the interference accompanying the rolling-off Doppler. This is done by means of the narrow band frequency locked processor.

Response time to a frequency shift:

The feedback frequency loop time constant of the tracking filter 41 determines the maximum rate of Doppler frequency shift of a roll-off that this system can follow before a loss of lock. In this case, it is approximately equal to the F/V converter time constant; namely 0.2 ms for the circuit of FIG. 5.

Response time to an amplitude variation:

The Automatic Gain Control (AGC) 46 time constant of the feedback loop 44 determines the maximum rate of an amplitude variation within its dynamic range that this system can follow before a loss of regulation at its output. The full-wave amplitude detector allows a decrease in the time constant of this AGC amplifier to quite small values (500 $\mu$s from 3.5 kHz to 140 kHz for the circuit of FIG. 5). During a Doppler roll-off, the pass-band of the voltage-controlled filter 41 will not be exactly tuned to the instantaneous frequency to be tracked due to the intrinsic time delay of the F/V converter 48. This frequency offset will cause an amplitude decrease at the output of the band-pass filter 41 that has to be corrected by the AGC. It is determined that the AGC dynamic range must be larger than the sum of the attenuation caused by this frequency offset and the maximum amplitude variation that could be expected during a roll-off (antenna side lobes . . . ). In addition, the AGC time constant must be smaller than the Doppler roll-off time constant ($\tau_u$).

Frequency dynamic range:

The linear dynamic frequency tuning range is limited by the physical nature of the components. The linear dynamic range of the OTA Model CA 3080A (as indicated by the manufacturer data sheet, RCA) is limited to 3 decades. The range is further limited by the nonlinearities of the fast loop and the stability aspect of the entire tracking unit for frequency as high as 600 kHz, yielding a ratio of 1 to 40 between the minimum and maximum frequency (namely from 3.5 kHz to 140 kHz for the circuits of FIG. 6).

Constant relative bandwidth:

The tunable band-pass filter 41 of this system has been designed to exhibit a constant Q characteristic (the ratio of the resonant frequency to the bandwidth is kept constant for any frequency) to insure a proportional rejection of the interferences for all Doppler frequencies within its tracking range. It could be modified to exhibit a constant bandwidth over the whole frequency range.

Figure 7:
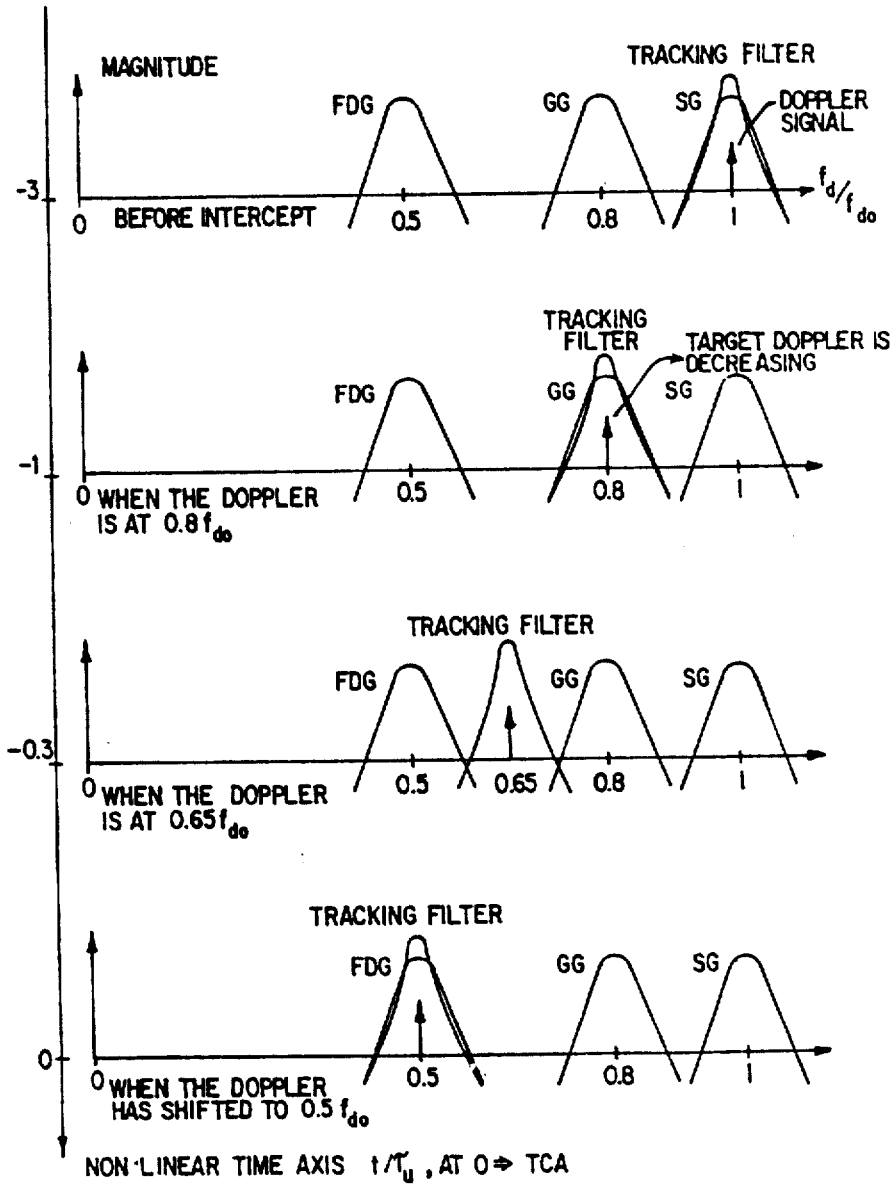
FIG. 7 is a diagram illustrating the difference between dynamic detection and static detection of TCA used by the tracking system of the invention and the fractional Doppler gate, respectively.

FIG. 7 is an illustration of the difference between dynamic detection and static detection of TCA used by the tracking system of the invention and the fractional Doppler gate, respectively. Magnitude frequency responses and magnitude of Doppler spectrums are drawn at four different instants of the roll-off to form a time history of the responses to the roll-off.

An explanation of the guard gate GG and the arming state, GGA:

The GG channel includes a filter 60 tuned at a higher frequency than the IF of speedgate 10. The GG (Guard Gate) channel processes a signal derived from one of the IF stages of the speedgate 10 (see FIG. 5). Thus, the GG exhibits an equivalent pass-band center frequency lower than the speedgate one. This has been illustrated in FIG. 7 by setting its equivalent center frequency at 0.8 $f_{do}$.

The GG output has to be enabled by the high level arm (HLA) from detector 12 before indicating a GGA.

When the frequency of the Doppler shift approaches the GG center frequency and when there is enough energy to activate its detector 62, this GG output and the HLA are combined in an AND gate 64 that triggers a monostable 65. The GGA holding time period is set to a value proportional to the larger $\tau_u$ of a roll-off that could be expected for any miss distance within the lethality zone.

The HLA indicates that the signal tracked by the speedgate prior to the intercept was of an adequately high-level to reflect the impending intercept (the signal increases as the missile-target distance decreases).

Figure 1:
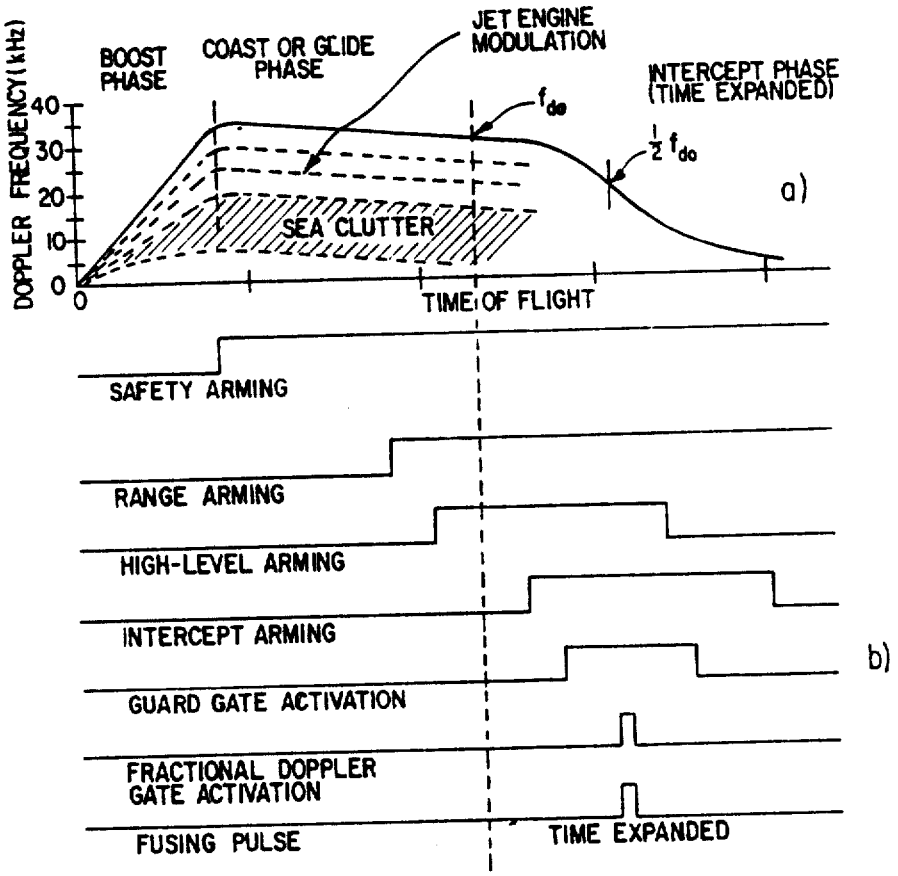
FIG. 1 is a time history of the spectral content of the Doppler signal in relation to the sequence of events that leads to fuzing.

Also, the arming conditions as shown in FIG. 1 (Safety and Range Arming, HLA, IA and GGA) have to be timely satisfied to allow the activation of the FDG, as well as of the tracking system of the present invention, to detonate the warhead.

Referring to FIGS. 5 and 6, the voltage-controlled band-pass tracking filter 41 consists of two cascaded voltage-controlled integrators 70, 71 arranged in a biquad structure (a realization of a biquadratic voltage transfer function, which is the ratio of two second order polynomials) with a summing amplifier 74 to generate complex poles. In closed loop, it operates like a very fast discriminator over the 5–140 kHz band; it is continuously tunable over this band by means of feedback loop 44 that senses its output and adjusts its center frequency so as to keep the band-pass center frequency in coincidence with the component of greatest amplitude in the Doppler signal. The loop includes a fast AGC amplifier 46 that matches the output of the band-pass filter 41 to the input of a fast frequency-to-voltage converter 48 that allows the frequency-tracking filter 41 to remain locked on the target return even during the roll-off of the Doppler at intercept.

The output of the F/V converter 48 is used to detect the time of closest approach. The speedgate 10 produces a voltage $V_s$ proportional to the frequency $f_d$ that it tracks. This voltage is applied to fractional ratio converter 50 where it is low-pass filtered (by U9-A and B) ($\tau$=220 ms), adapted (scaled) to the F/V converter 48 output $V_{c1}$ (14 kHz/V) and attenuated by a factor of 0.6 in the fractional ratio converter 50 to finally constitute the reference for firing which is applied as one input to Doppler frequency comparator 52. The appropriate time for fuzing is detected when the low pass filtered output ($V_{c5}$ from filter 75) of the F/V converter 48, applied to another input of comparator 52, becomes smaller than or equal to this reference, given the occurrence of fuze arming. The output of comparator 52 drives a monostable circuit 20 to produce a pulse of predetermined duration for fuze switch 22.

The band-pass filter 41 has been designed with operational transconductance amplifiers (OTA's) specifically RCA CA-3080, although other types of OTA's could be used. Adding and voltage-following operations are implemented with operational amplifiers. This configuration allows the resonant frequency of the filter to be tuned linearly with the 5–140 kHz band. The quality factor Q and the gain of the filter remain constant over the band.

The feedback loop 44 senses the output $E_o$ of the band-pass filter 41 and produces the control voltage $V_{C1}$ that moves the resonant frequency of the filter 41 toward coincidence with the frequency that dominates $E_0$. This is done as follows:

The fast AGC amplifier 46 amplifies $E_0$ to a reference level compatible with the driving signal of the frequency-to-voltage converter 48 that follows it. This AGC amplifier uses an OTA (U5) as a variable gain amplifier (U5, U6-A) to maintain the output at a fixed amplitude. The output of the OTA is full-wave rectified, filtered and compared (U6-D) to a reference amplitude to produce an error voltage which, after having been filtered (U6-C), controls the gain of the OTA. The full-wave rectifier allows decreasing the time constant of the AGC amplifier to as low as 1 ms while its amplitude dynamic range is on the order of 50 dB.

The F/V converter 48 transforms the saturated waveform (output of U6-B) presented to it into a train of 50 ms duration pulses whose repetition rate is proportional to the frequency of the input waveform. This is done using a combination of logical exclusive OR gates (U7) and delay operations. The pulses are averaged through a fast-charge and slow-discharge circuit (U8-B) with time constants set to 2 μs and 220 μs respectively. The output voltage ($V_{C1}$) is adjusted to give 14.0 kHz/V and an operational amplifier (U8-A) transforms (and filters) it into the voltage $V_{C2}$ which controls the resonant frequency of the band-pass filter 41. When $V_{C2}$ is varied from −15 to 13 V, the resonant frequency of the band-pass filter 41 is moved from 5 to 140 kHz.

The novel aspect in the implementation of the Doppler fuze processor as a replacement of the fractional Doppler gate in a missile stems from its capability to dynamically track the target return during roll-off as opposed to static detection of the rolling-off doppler at a fixed fractional Doppler frequency. The processor tracks the target return continually after fuze arming while the speedgate coasts on its pre-intercept frequency.

The accurate detection of the time of closest approach depends on the following:

(1) the tunable bandpass filter 41 must exhibit a constant frequency-to-bandwidth ratio (quality factor Q) to insure a proportional rejection of the interferences for all the frequencies within its tracking range. The value of Q determines the immunity of the processor to noise and interference signals.

(2) the value of Q and the speed of the feedback loop determine the capacity of the processor to react rapidly to changes in the frequency content of its input such as those characterizing the Doppler roll-off. For this matter, the response time of the feedback loop is dependant on the response time of the F/V converter 48 and AGC amplifier 46.

(3) the time constant of the AGC amplifier of the feedback loop determines the maximum rate with which a variation in the amplitude of the input signal can be followed by the processor.

Experimental investigation has demonstrated that the operation of the processor is optimum when the quality factor Q is set to about 15, when the time constant of the AGC amplifier is 1 ms, and when the speed of the feedback loop is around 200 μs. This setting of the parameters takes into account that in some instances the Doppler roll-off may take place in a time interval as short as 2 ms.

The detailed schematic (FIG. 6) includes an adaptive equalizer (tunable high-pass filter) whose frequency response is controlled by the AFC of the speedgate. This control keeps the adjustment (tuning) of the high-pass filter cutoff frequency to a specific fraction of the Doppler frequency indicated by the speedgate, i.e. at approximately one half the Doppler frequency tracked by the speedgate. The cutoff frequency is voltage controlled by the AFC of the speedgate via the fractional ratio converter and adapted to the necessary level (slope and offset) by an operational amplifier (U1-C of FIG. 6). This is implemented by controlling the transconductance of the three OTA's (U4, U11 and U13) that generate the variable poles of the third-order high-pass filter. Thus, this adaptive equalizer modifies the video spectrum by the tunable high-pass filter at frequencies that follow the Doppler frequency tracked by the speedgate. The equalizer is inserted between the video amplifier (not shown) and the input labelled "VIDEO INPUT" at FIGS. 3 and 5. It reduces the clutter and noise at the input of the speedgate, the GG and the tracking filter.

Figure 6A:
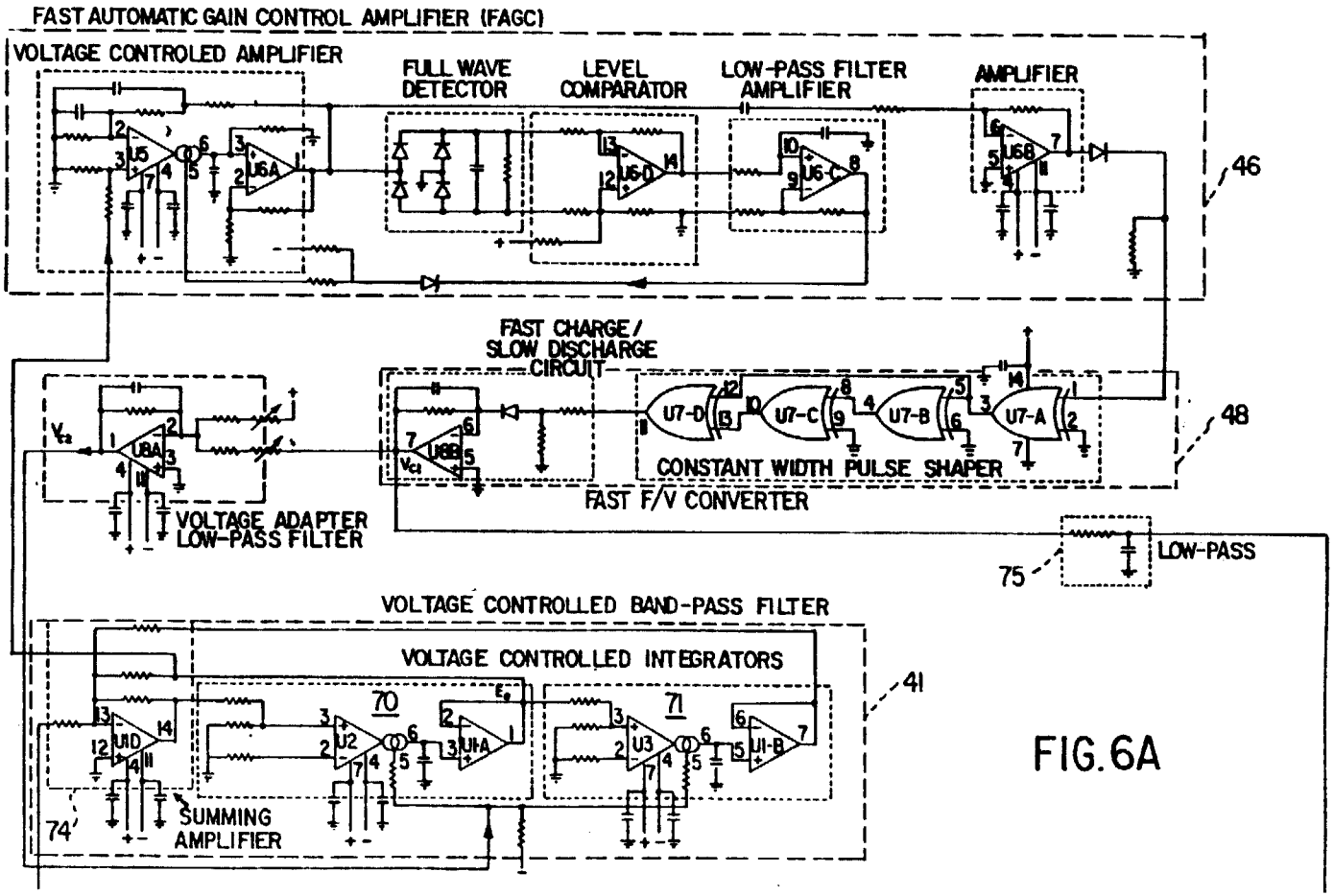
Figures 6B, 6C:
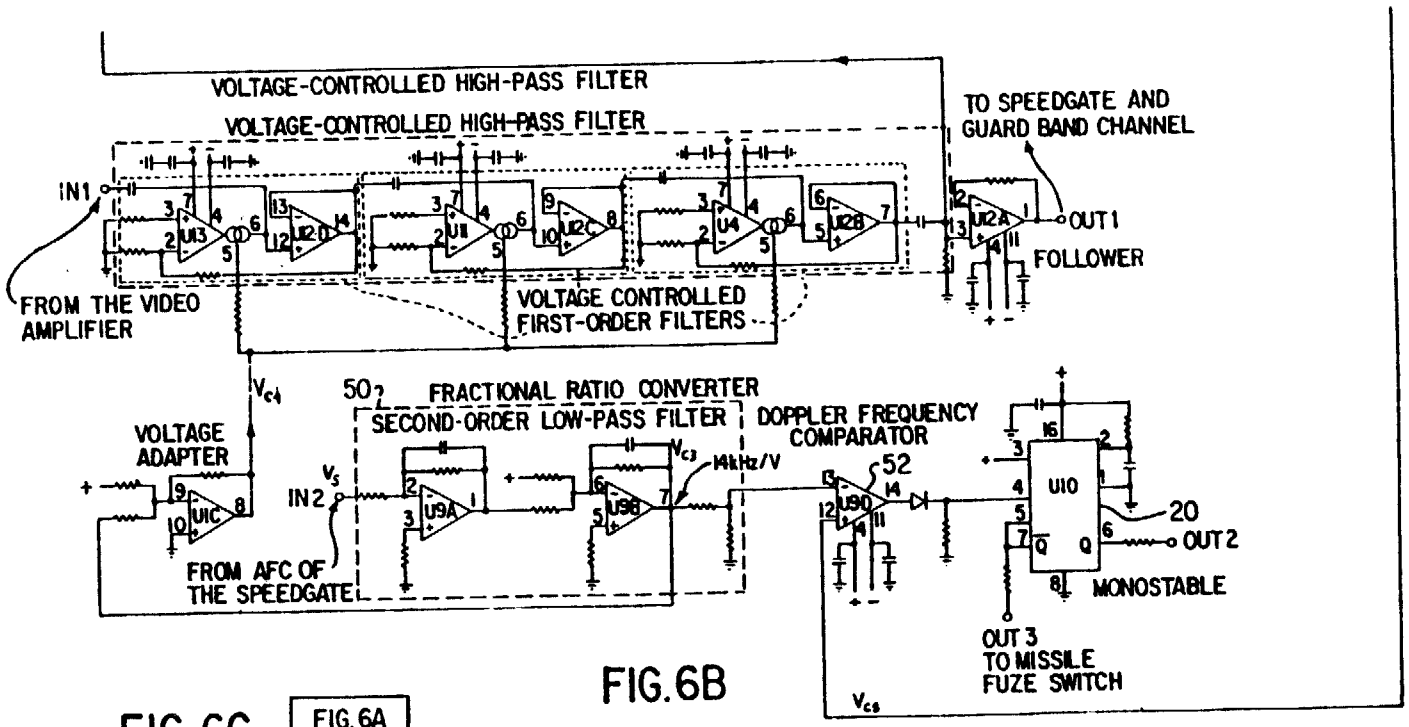

In FIGS. 6A and 6B, U1, U6, U8, U9 and U12 are Operational Amplifiers U2, U3, U4, U11 and U13 are Operational Tranconductance Amplifiers, U7 is an Exclusive Or Gate and U10 is a Retriggerable/Resettable Monostable Multivibrator.

The embodiments of the invention in which an exclusive property or privilege is claimed are defined as follows:

1. A Doppler tracking processor and time of closest approach detector system comprising:

first means for deriving a reference signal proportional to a predetermined fraction of the frequency of a Doppler signal, said first means comprising a fractional ratio converter having an input to receive a voltage proportional to the Doppler signal, said converter having filtering and attenuation means for deriving said reference signal from said voltage;

second means for deriving a second signal which is dynamic and is proportional to the instantaneous Doppler frequency of the Doppler signal during Doppler roll-off; and comparator means for comparing said second signal and said reference signal, said comparator producing an output signal if said second signal drops below said reference signal.

2. A system as claimed in claim 1 wherein said second means comprises a tunable band-pass filter having a first input to receive said Doppler signal, a control input, and an output, said output being connected to the input of a feedback loop having an output connected to the control input of the tunable band-pass filter.

3. A system as claimed in claim 2 wherein the output of the feedback loop is also connected to a low-pass filter, said low-pass filter having an output connected to said comparator.

4. A system as claimed in claim 3 wherein said feedback loop comprises a fast automatic gain control circuit followed by a fast frequency-to-voltage converter.

5. A system as claimed in claim 4 further including means for scaling said reference signal to the output of the frequency-to-voltage converter.

6. A system as claimed in claim 5 further including means for continuously tuning the tunable bandpass filter over the 5–150 kHz band.

7. A system as claimed in claim 6 wherein the feedback loop includes means for adjusting the center frequency of the tunable band-pass filter to keep its bandpass center frequency in substantial coincidence with the component of greatest amplitude in the Doppler signal.

* * * * *